United States Patent [19]

Lefeber et al.

[11] Patent Number: 5,185,198
[45] Date of Patent: Feb. 9, 1993

[54] BENT STRUCTURE COMPRISING OUTER METAL SHEETS IN A SOFT W CONDITION BONDED BY AN ADHESIVE LAYER

[75] Inventors: Paul Lefeber, Lisse; Rene Botterman, Culemborg; Cornelis Van Tilborgh, Zwanenburg; Loek Van Veggel, Maarsen, all of Netherlands

[73] Assignee: Fokker Aircraft B.V., Schiphol-oost, Netherlands

[21] Appl. No.: 577,784

[22] Filed: Sep. 5, 1990

[51] Int. Cl.$^5$ .................. B32B 15/04; B32B 15/08; B32B 27/00; B32B 7/00
[52] U.S. Cl. .................. 428/251; 428/245; 428/246; 428/289; 428/290; 428/294; 428/416; 428/418; 428/457; 428/458; 428/461; 428/902
[58] Field of Search ............. 428/457, 458, 461, 213, 428/251, 245, 246, 289, 290, 294, 416, 418, 902

[56] References Cited

U.S. PATENT DOCUMENTS

| | | | |
|---|---|---|---|
| 4,489,123 | 12/1984 | Schijve et al. | 428/458 |
| 4,500,589 | 2/1985 | Schijve et al. | 428/458 |
| 4,749,625 | 6/1988 | Obayashi et al. | 428/461 |
| 4,935,291 | 6/1990 | Gunnink | 428/457 |
| 5,030,488 | 7/1991 | Sobolev | 428/457 |

FOREIGN PATENT DOCUMENTS 1303301  1/1973  United Kingdom .

Primary Examiner—George F. Lesmes
Assistant Examiner—James D. Withers
Attorney, Agent, or Firm—Handal & Morofsky

[57] ABSTRACT

To improve forming properties of laminated structures comprising two sheets of a non-ferrous metal alloy connected by an adhesive, which hardens at heating and between which an adhesive layer is bonded to the metal sheets, a new sequence of heat treatments is proposed. The alloy of the sheets is in soft condition before the sheets are bonded to each other. The bonding temperature and time are selected such that it remains substantially in soft condition and only after forming further heating is applied to obtain hardening of the alloy sheets.

9 Claims, 2 Drawing Sheets

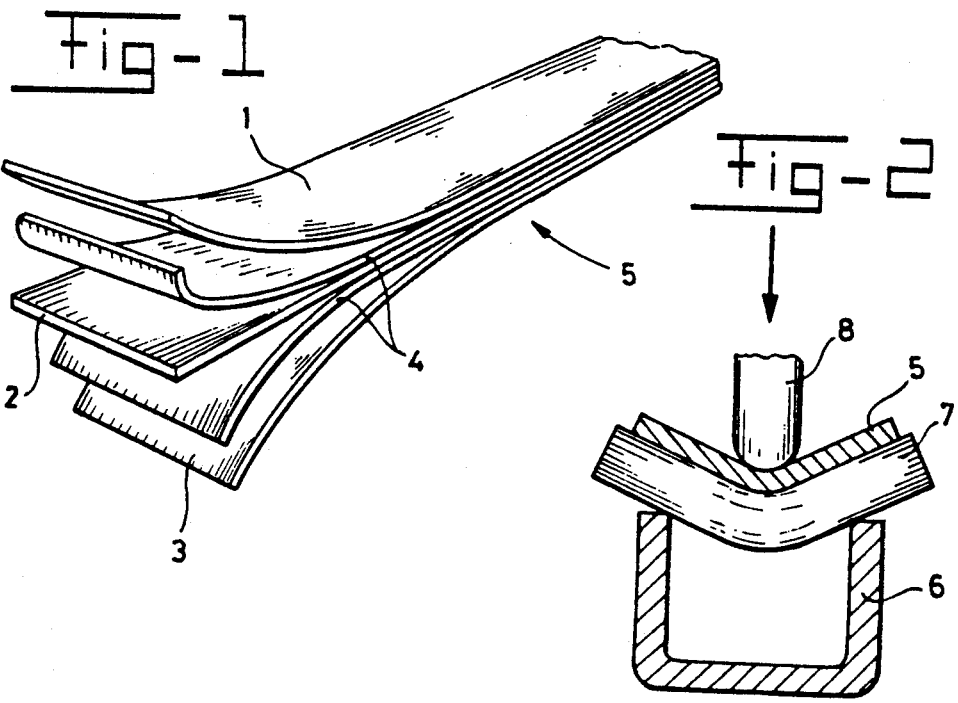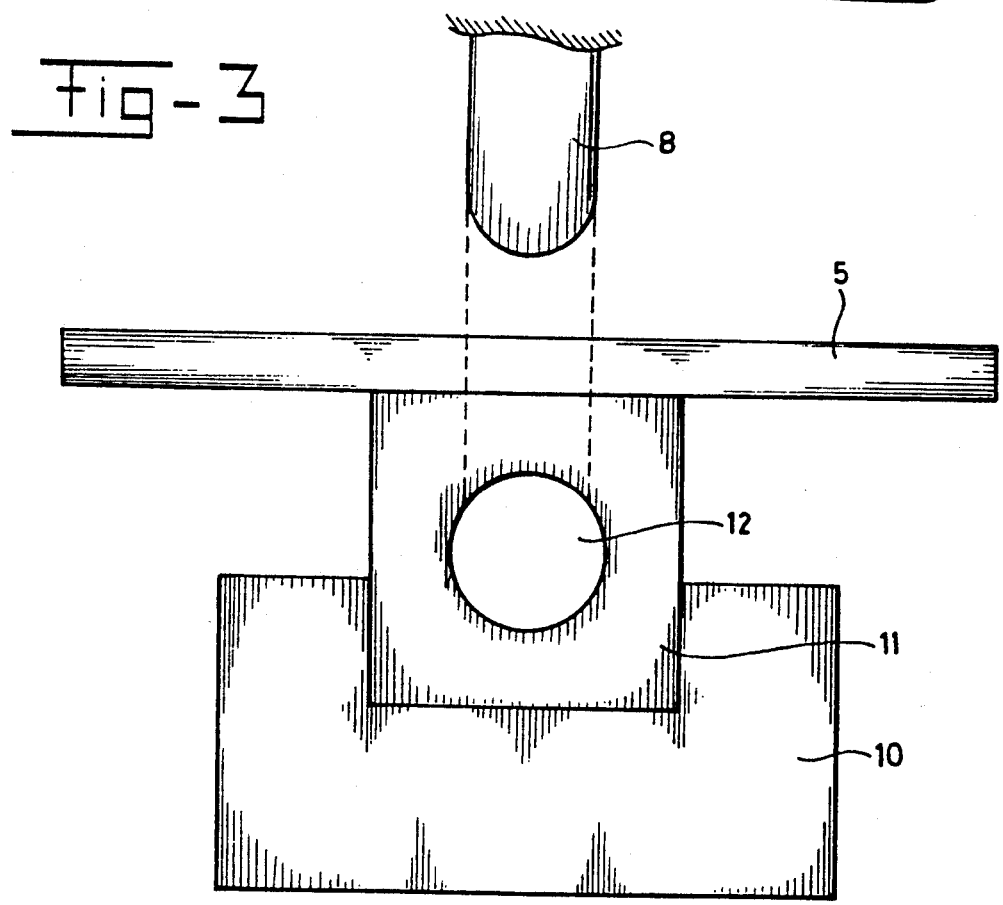

BENT STRUCTURE COMPRISING OUTER METAL SHEETS IN A SOFT W CONDITION BONDED BY AN ADHESIVE LAYER

BACKGROUND OF THE INVENTION

This invention relates to hybrid laminates built up from two or more alternating layers of non-ferrous alloy sheet and fibre layers which are impregnated with resin, bonded together during a time/temperature cycle under pressure. The metal sheets are on both the outer faces.

A version of such a laminate is ARALL which is typically built-up from aluminium alloy sheets thinner than one millimeter and intermediate layers of impregnated aramid fibres. The built-up of the ARALL laminate can be coded according to the ALCOA ARALL material specification. A commercially introduced 5/4 ARALL laminate by Alcoa for example, consists of five sheets of an aluminium alloy, each sheet having a thickness of 0.3 mm, and four intermediate layers of unidirectional fibre/resin, each having a thickness of 0.2 mm. A digit added to the code indicates the quality of the metal sheet used. For example, ARALL 3 refers to sheets of aluminium alloy 7475-T761 according to Aerospace Material Specification SAE AMS 4085B. The code T761 indicates the heat treatment of the sheet used which is a solution heat treatment, quenching, double stage precipitation heat treatment and stabilisation. By using metal sheets of different alloys and tempers, or different adhesive/fibre layers (fibre type and resin type), or different fibre orientations, or by applying more or less layers, a wide range of hybrid laminates with different characteristics can be obtained.

Hybrid laminates are used instead of monolithic material because of the improved characteristics with regard to strength, damage tolerance, lower density and good damping characteristics. Referring to the durability properties, the fatigue strength is considerably better than that of monolithic material. The sigma 0.2, the strengt and fatigue resistance of hybrid metal laminates in general are substantially higher than of monolithic AL alloys. Moreover, the specific weight is between 8–15% lower. In the case of ARALL the elongation at failure in fibre direction is relatively low because of the small elongation of the aramide fibres. Forming of the laminate perpendicular to the fibres is limited due to the precipitated metal used.

The hybrid laminates can be used in the form of sheets, doublers and stiffeners. Aircraft structures for example comprise a combination of all three.

DESCRIPTION OF PRIOR ART

An indication of the use of hybrid laminates for stiffeners (strengthening profiles) is disclosed in the magazine "Aircraft Production" of November 1953 and in "Aero Research Technical Notes" No. 114 of June 1952. In "Aircraft Production" a method is disclosed for producing profiles for wing structures. A metal laminate is described, having a non reinforced adhesive layer. The edges of the laminate were bent to an angle profile.

Another method for obtaining a laminated profile (stiffeners) is described by R. J. Schliekelmann in "Aero Research Technical Notes" indicated above. Several sheets are formed individually before bonding after which they are bonded together.

More recent examples of stiffeners of a metal laminate can be found in the proceedings AGARD-LS-102 of April 1979. "Bonded Joints and Preparation for Bonding", page 1–14; in the proceedings of the 14th ICAF Aircraft Symposium in Ottawa, Jun. 10–12, 1987, the lecture 3.1 by L. H. van Veggel c.s.; the SAMPE Conference in Mineapolis, Autumn 1988, the lecture of R. N. Bently et al and also the article of J. W. Gunnink in the Journal of Aircraft of Novemer 1988. The latter three publications are related to ARALL reinformed metal laminates and conform to the patents EP 56288 and 56289. Bentley indicates a method for forming a ARALL laminate into a profile. Here a pad of elastomeric rubber material, having a hardness of about 95 shore A, is placed between the laminate to be formed and the open side of a U-profile. The U-profile cannot be distorted and has at least the same length as the stiffener to be formed. Bending of the rubber pad in combination with the laminate can be compared with a three point bending test. By the use of rubber material even distribution of forces over the laminate is guaranteed.

SUMMARY OF THE INVENTION

Although the use of hybrid laminates such as ARALL for bonded structures consisting of skins stiffened by profiles is highly desirable, up to now several problems have occurred during the forming of flat hybrid laminates into profiles with relatively small radii. This is caused by the fact that the aluminum alloys sheets of the laminate have been subjected to a solution heat treatment, quenching and precipitation. It has been shown that in the after-precipitation condition the ARALL-laminate can not be bend to relatively small radii. Such a small radius is desirable because it increases the structural efficiency of panels (e.g. local buckling). Furthermore the structural efficiency of panels requires small radius stiffeners because of rib/panel coupling. If a laminate, e.g. a laminate as shown in FIG. 14 at page 1–14 of above mentioned AGARD report, or an ARALL-laminate is subjected to bending beyond a predetermined point, delamination can occur due to the considerable shear forces or the metal sheets can crack. Even using the method described above, with a rubber pad and U-profile, has not given satisfactory results although the bending forces were evenly distributed over the laminate.

If the material of the stiffener was not a laminate but a monolithic layer of an aluminium alloy, it would be possible to heat-treat it before bending to about 495.C, which is the solution heat treatment temperature.

After bending, the material is heat treated to its final condition. However, it is not possible to do so with metal laminates because such high temperatures will deteriorate the adhesive and/or fibre properties and the adhesion between adhesive and metal. To avoid too high temperatures it might be possible to first shape the individual sheets (in the end condition T3 or T6) which is usual for aluminium alloy and then bond them together to a thicker profile. Such a method is indicated in "Aero Research Technical Notes", as mentioned above. This can also be done with thin Arall laminates later bonded together to a thick profile. This method however, is quite complicated and expensive.

According to the invention, a hybrid laminate is provided having improved forming properties. Generally according to the invention the metal sheets used for the laminates are in the soft condition. Only after shaping the laminates to its desired configuration, it is heat treated to obtain the finally desired mechanical properties. A main advantage of the invention is that these laminates can be bent to stiffeners with smaller radii than obtained when the prior art laminates were used, without deteriation of the mechanical properties.

According to a preferred embodiment in the adhesive a fiber reinforcing material is introduced. This material can comprise aramide fiber, glas fiber, carbon fibers or boron fibers.

The metal sheet material can comprise any material having the property that it hardens at heating, such as aluminium alloys, copper alloyers and nickel alloys. Examples of aluminium alloys are alluminium copper alloys such as those of the AA(USA) no. 2024 type or aluminium-copper-lithium alloys, such as those of the AA(USA) no. 2090022091, or aluminium magnesium-silicium alloys, such as those of the AA(USA) No. 6013 or 6061 type or aluminium-zinc alloys such as those of the AA(USA) No. 7075 or 7074, 7075 type or aluminium-lithium alloys, such as those of the AA(USA) No. 8090 or 8091 type.

According to a preferred embodiment the adhesive layer consists of a synthetic material, such as epoxy resin or thermoplastic resin or phenolic resin or bismalimide resin.

The invention also relates to a method for realizing a laminate comprising the provision of at least two non-ferrous sheets, which harden at heating and which are bonded together in a soft condition by an adhesive layer. Before or after hardening by heating post stretching can be realized. Bonding is realized before heating by such a temperature/time/pressure cycling that hardening of the metal sheets is avoided. To promote bonding the metal sheets can be anodized before hand. The adhesive material used is preferably a high temperature curing epoxy resin or thermoplastic resins able to obtain overaged temperconditions.

The invention also relates to a method for producing a structure comprising at least partially realizing of a laminate as described above followed by a precipitation hardening treatment. Realizing of the structure can comprise bending.

The invention also relates to a bent structure comprising a laminate having at least two sheets of a non-ferrous alloy, which harden at heating, and adhesive layers located between each pair of said sheets, wherein the alloy is in its soft condition and has a hardening temperature lower than the temperature affecting the adhesive layer and is bent after which it is heat treated to a temperature not significantly affecting the mechanical properties of the adhesive layer.

BRIEF DESCRIPTION OF THE DRAWINGS

FIG. 1 shows partially exploded an example of the laminate according to the invention;

FIGS. 2 and 3 show schematically methods for forming metal sheet, prior art metal laminates or a laminate according to the invention;

DESCRIPTION OF PREFERRED EMBODIMENT

Figure 4:
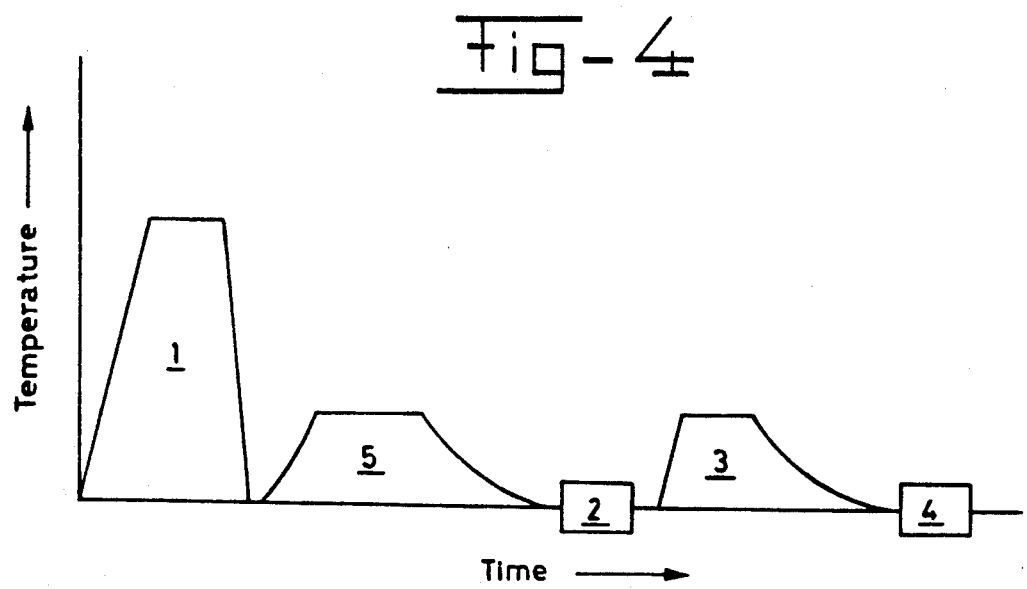
FIG. 4 shows a diagram of the heat treatment and forming of a laminate according to the prior art.

Hybrid laminates are built-up from two or more alternating layers of non ferrous alloy sheet and fibre layers wich are inpregnated with resin, bonded together during a time temperature cycle under pressure.

In FIG. 1a 3/2 laminate is shown comprising metallic sheets 1, 2 and 3 and intermediate fibre reinforced resin layers 4. The metallic sheets can be of an aluminum alloy from the 2000, 6000 and 7000 series as specified by the aluminium Association. The intermediate layers can comprise a structural adhesive, strengthened by fibres e.g. carbon, glass or polyaramide.

In FIG. 2 a device for bending a laminate 5 is shown. On a rigid U-shaped profile 6 a pad of rubber material 7 is placed, above which laminate 5 is arranged. From the flat condition it is formed into a curved shape by lowering of die 8. Because of the rounded tip of die 8 and the presence of rubber pad 7, pressure distribution is as even as possible. In FIG. 3 another device for the bending of hybrid laminates is shown. Instead of using a U-shaped profile wherein a rubber pad is bent, a metal support 10 is used having an opening wherein rubber block 11 with opening 12 is introduced. As indicated above, in the prior art, problems occurred during bending of laminates such as the above mentioned 3/2 ARALL-1 laminate to very small radii.

In FIG. 4 a diagram is shown schematically indicating the heat treatment according to the prior art, e.g. for ARALL-1. The metal sheets used for ARALL 1 laminates are solution heat treated (495 C.) and quenched. A 24 hours precipitation heat treatment at 120 C. to the T6 condition follows. This procedure is indicated in FIG. 4 with block 1 and 5 respectively. Finally the surfaces of the sheets are prepared for bonding by anodising and priming. This process, described for example by the British specification DEF STAN 03-24, issue 1, is indicated with block 2. In block 3 the sheets are put together with the interposition of the fibre reinforced adhesive layer and cured under pressure at 120 C. for one hour. After cooling down the laminate is ready to be supplied to the purchaser. Metal forming by the purchaser is indicated by block 4.

Figure 5:
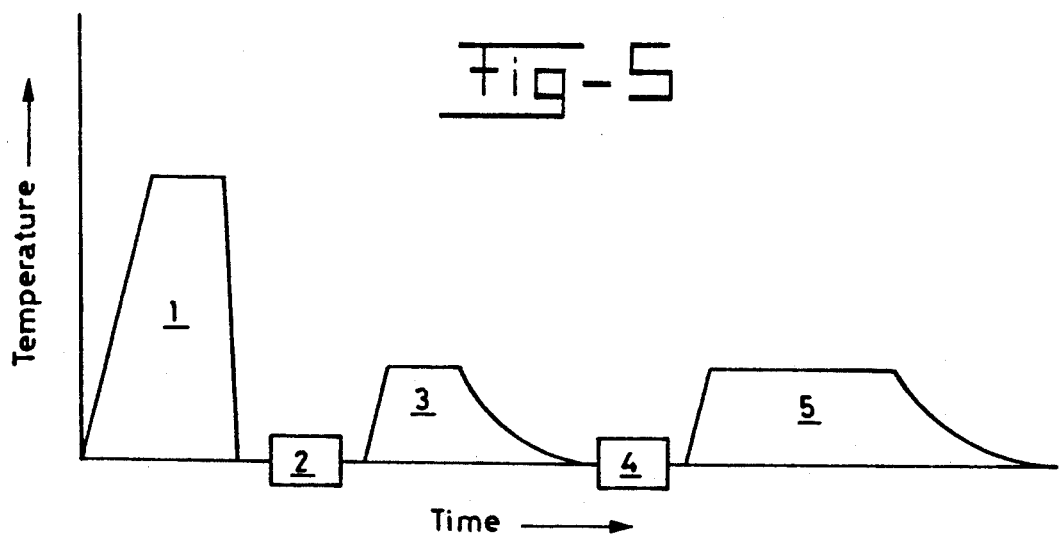
FIG. 5 shows a diagram of the heat treatment and forming of a laminate according to the subject invention.

In FIG. 5 heat treatment and forming of the laminate according to the invention is shown diagrammatically. As an example for Arall-1, after solution heat treatment the metal sheets are quenched as is indicated in block 1. The sheets are now in the AQ-condition. This condition is not stable. The material will transform into the W-condition. Then the surfaces are pretreated for bonding, indicated with block 2, by a process as noted above with block 2 of FIG. 4. After that, the sheets are bonded with aramid reinforced adhesive layers. The curing process is indicated by block 3. An attendant effect of the heating of the metal sheets during the bonding process during one hour at 120° C. is, that a start is given to the precipitation. Because a complete treatment takes 24 hours, no substantial precipitation will occur and only an undefined TX-condition is created. Such a condition is far from a T6 condition. That means that the laminate is much softer than a laminate in the T6-condition and consequently it's forming properties are improved. In other words, the soft TX condition of the metal sheets is closer in temper to that of the quenched alloy than to the final T6 temper obtained after a full precipitation-hardening. In this soft condition the laminate is suitable for forming and bending and is delivered to the purchaser. Block 4 represents forming of the laminate by the purchaser. To obtain, after forming, the desired mechanical properties, in casu the T6-condition, it is necessary to complete above mentioned heat treatment for about 23 hours at 120° C. This step is expressed by block 5. After this treatment the mechanical properties substantially correspond to the material as indicated in FIG. 4. However, the forming step, indicated by block 4, is much improved as can be seen from the comparative bending test results. The results are conducted with a device as shown in FIG. 3 and are summarised in table I.

In this table R is the radius of the tip of die 8 in FIG. 3. H is the extention of the rubber block 11 above support 10 in millimeters. Vb is the speed of die 8. Die 8 was moved downward until an angle of 110° of the deformed laminates was realised.

In table I 3/2 ARALL 1 produced according to the prior art is compared with 3/2 laminate produced according to the invention being substantially the same as 3/2 ARALL 1 except for the heat treatment as explained above.

TABLE I

Comparison of bending result between prior art and according to the invention.

| | R mm | Hbed mm | Vb mm/min | Remarks |
|---|---|---|---|---|
| 3/2 ARALL 1 prior art | 4 | 10 | 20 | failed |
| | | | 60 | |
| | | | 100 | |
| | | 20 | 20 | failed |
| | | | 60 | |
| | | | 100 | |
| | | 30 | 20 | failed |
| | | | 60 | |
| | | | 100 | |
| 3/2 ARALL 1 laminate according to invention | 4 | 10 | 20 | ok |
| | | | 60 | |
| | | | 100 | |
| | | 20 | 20 | ok |
| | | | 60 | |
| | | | 100 | |
| | | 30 | 20 | ok |
| | | | 60 | |
| | | | 100 | |

From this table it is clear that with the laminate produced according to the invention much improved bending properties are obtained. After bending the laminate produced according to the invention, it is subjected to a further heat treatment to obtain its final strength.

In table II the minimum bending radius in millimeters is given for different kinds of ARALL materials produced according to the prior art and according to the invention.

TABLE II

Minimum bending radii of different Arall laminates and laminates according to the invention.

| | radius (mm) |
|---|---|
| 3/2 ARALL 1 | 6 |
| 3/2 ARALL 3 | 5 |
| 3/2 laminate invention | 4 |
| 4/3 ARALL 1 | 10 |
| 4/3 ARALL 3 | 8 |
| 4/3 laminate invention | 6 |
| 5/4 ARALL 1 | 11 |
| 5/4 ARALL 3 | 10 |
| 5/4 laminate invention | 8 |

Although the invention as described above referring to a preferred example it is clear that many amendments can be made without leaving the scope of protection of the subject application. First of all it is possible to use the laminate without bending. Of course any other laminate combination can be used as long as the metal sheets do possess a precipitation hardening property and the temperature of precipitation does not effect the properties of the adhesive layer being sandwiched between the sheets. Also the adhesive layer can comprise all kinds of layers known in the prior art both thermosetting and thermoplastic resin material which can incorporate all kind of fibres. It is also possible to subject the laminate to a poststressing treatment after which the internal stress distribution is favorable for fatigue (compression in the metal sheets).

This post stressing can be adjusted either after curing of the laminate or after the precipitation treatment.

We claim:

1. A hybrid laminate comprising:
   (a) at least two sheets of a solution heat-treated and quenched non-ferrous metal alloy which alloy is in a soft condition being a W condition and is capable of being hardened at an elevated hardening temperature to a final temper, said soft W condition being closer in temper to that of the quenched alloy than to said final temper; and
   (b) an adhesive layer bonding said metal sheets together, the adhesive of said layer being selected to be curable under conditions that are not effective to harden said soft metal alloy;
   wherein said non-ferrous metal alloy is selected so that said hardening temperature does not deleteriously affect said adhesive layer; whereby said laminate can be formed by bending and is substantially more bendable than when hardened to said final temper.

2. A laminate according to claim 1 wherein said adhesive layer includes a reinforcing material.

3. A laminate according to claim 1 wherein said metal sheets comprise an alloy selected from the group consisting of aluminum, copper, and nickel alloys.

4. A laminate according to claim 1 wherein the adhesive layer consists of a synthetic resin material.

5. A laminate according to claim 2 wherein said reinforcing material is selected from the group consisting of aramid fibers and glass fibers.

6. A laminate according to claim 1 wherein said adhesive material is selected from the group consisting of high temperature-curing epoxy resins, phenolic resins, bismalimide resins and thermoplastic resins capable of obtaining overaged temper conditions.

7. A hybrid laminate according to claim 1 wherein the non-ferrous metal is 7075 or 7475 material according to AA (USA).

8. A hybrid laminate comprising:
   (a) at least two sheets of a non-ferrous metal alloy which alloy is in a soft W condition and is capable of being hardened at an elevated hardening temperature to a final temper substantially stronger than said W condition; and
   (b) an adhesive layer bonding said metal sheets together, the adhesive of said layer being selected to be curable under conditions that are not effective to harden said soft metal alloy;
   wherein said non-metal alloy is selected so that said hardening temperature does not deleteriously affect said adhesive layer; whereby said laminate can be formed by bending without damage and is substantially more bendable than when hardened to said final temper.

9. A hybrid laminate comprising:
   (a) at least two sheets of a solution heat-treated and quenched non-ferrous metal alloy which alloy is in a soft condition, being a W condition, said alloy having soft-condition ductility properties and being capable of being hardened at an elevated hardening temperature to a hardened condition in which said alloy has hardened condition ductility properties said alloy also having quench condition ductility properties when solution heat-treated and quenched; and (b) an adhesive layer bonding said metal sheets together, the adhesive of said layer being selected to be curable under conditions that are not effective to harden said soft metal alloy;

wherein said non-ferrous metal alloy is selected so that said hardening temperature does not deleteriously affect said adhesive layer and the ductility properties of said alloy in said soft W condition are closer to said quenched condition ductility properties than to said hardened condition ductility properties whereby said laminate can be formed by bending and is substantially more bendable than when hardened to said hardened condition.

* * * * *